United States Patent [19]

Zisapel

[11] Patent Number: 5,867,493
[45] Date of Patent: Feb. 2, 1999

[54] APPARATUS AND METHOD FOR SELECTIVE MASKING OF TELECOMMUNICATIONS SYSTEMS

[75] Inventor: Yehuda Zisapel, Tel Aviv, Israel

[73] Assignee: Rad Data Communications Ltd., Ramat Hachayal, Israel

[21] Appl. No.: 406,564

[22] Filed: Mar. 20, 1995

[51] Int. Cl.⁶ .................................................. H04B 1/66
[52] U.S. Cl. .......................................... 370/351; 370/477
[58] Field of Search .................................. 370/202, 217, 370/221, 351, 419, 477, 501, 402

[56] References Cited

U.S. PATENT DOCUMENTS

| | | | |
|---|---|---|---|
| 4,032,719 | 6/1977 | Blasbalg | 370/376 |
| 4,823,342 | 4/1989 | Morita et al. | 370/202 |
| 5,297,147 | 3/1994 | Shimokasa | 375/241 |
| 5,400,334 | 3/1995 | Hayssen | 370/245 |
| 5,592,486 | 1/1997 | Lo et al. | 370/471 |

OTHER PUBLICATIONS

International Networking Products, Network Equipment Technologies. (brochure).
The 3630 MainStreet, Newbridge. (brochure) 2 pages.
INDX/20–S Communications Resource Manager, Network Equipment Technologies. (brochure) 2 pages.
ADNX/60 Access Communications Resource Manager, Network Equipment Technologies. (brochure).

*Primary Examiner*—Benedict V. Safourek
*Attorney, Agent, or Firm*—Banner & Witcoff, Ltd.

[57] ABSTRACT

A telecommunications apparatus is disclosed for use in conjunction with a local switch. The apparatus operates in a bypass mode for messages that do not require compression/decompression, and in a pass-through mode for those which do. A selective compressor/decompressor is provided to decompress incoming information for which the local switch is to operate in pass through mode and to compress outgoing information for which the local switch has operated in pass through mode. A selective masker/demasker is operative to expand information to be bypassed by the switch without decompressing the information from a compressed form to an expanded form and to restore information bypassed by the switch from the expanded form to the compressed form.

13 Claims, 9 Drawing Sheets

APPARATUS AND METHOD FOR SELECTIVE MASKING OF TELECOMMUNICATIONS SYSTEMS

FIELD OF THE INVENTION

The present invention relates to telecommunication systems.

BACKGROUND OF THE INVENTION

Private voice networks include telephone apparatus, telephone exchanges (PABX) and transmission equipment. State of the art transmission equipment utilizes compression multiplexers, which convert analog voice signals to digital signals at low bit-rates of 9.6 kbps or even lower. Various compression methods are employed which all take advantage of the inherent redundancy which exists in human speech.

If compressing multiplexers are installed between PABX's, as shown in Fig. BA-1, the voice signal may be compressed and decompressed more than once in PABX networks with more than one hop. Each compression/decompression pair degrades the voice signal quality somewhat, and therefore in large networks it is very likely that the end-to-end voice signal quality will be unacceptable to the users.

To overcome this problem, more complex multiplexers have been developed, as shown in Fig. BA-2, in which the multiplexers also handle the routing function. Each voice channel is compressed by the first multiplexer and decompressed by the last multiplexer in the chain of multiplexers. All other interim multiplexers bypass the digital voice signal, such that voice signal quality is kept at a constant level. The drawback of this approach is that since the compressing multiplexers perform the routing function, they are relatively complex and expensive.

In the present specification, the first (source) and last (destination) nodes in a chain of nodes handling a call are termed "pass through" nodes, whereas the intermediate nodes, i.e. all nodes handling the call other than the first and last nodes, are termed "bypass" nodes.

There exists PBX/PABX equipment on the market that includes routing functions. As a result, a network can be formed among the PBX/PABX using regular voice channels. If the voice channel bandwidths are compressed, a routing multiplexer is required in order to avoid multiple voice compression/decompression along some of the network routes.

State of the art telecommunications systems include the following: The Integrated Digital Network Exchange, ADNX/60 and IDNX/20-S systems, all marketed by Network Equipment Technologies, and the 3630-MainStreet Primary Rate Multiplexer, marketed by Newbridge.

SUMMARY OF THE INVENTION

The present invention seeks to provide improved telecommunications apparatus.

The present invention also seeks to provide PABX equipment for routing voice calls, thereby relieving the compressing multiplexers from duplicated implementation of the routing function. Each multiplexer, when receiving a certain voice signal from a PABX, compresses the signal if the PABX is the first in the chain, masks the signal for bypass by the PABX if the PABX is an interim PABX, and decompresses the signal if the PABX is the last PABX in the chain. The masking process typically includes a process whereby information to be bypassed is expanded without being decompressed.

Each multiplexer analyses the signalling information which is associated with each voice channel, and decides how to treat it. In this way, the compression/decompression cycle is performed only once, and voice signal quality is maintained at a high level. Voice signal masking is performed in all interim PABX units. The decision to compress or mask or to decompress or demask is taken based on information read from the PABX signalling channels. The demasking process is the inverse of the masking process.

The network can be expanded substantially without limit on the number of network nodes. The invention is applicable also to PABX equipment or any other similar functioning equipment.

There is thus provided, in accordance with a preferred embodiment of the present invention, telecommunications apparatus for use in conjunction with a local switch operative in either of a bypass mode and a pass through mode, the apparatus including a selective compressor/decompressor operative to decompress incoming information for which the local switch is to operate in pass through mode and to compress outcoming information for which the local switch has operated in pass through mode, and a selective masker/demasker operative to expand information to be bypassed by the switch, without decompressing the information, from a compressed form to an expanded form and to restore information bypassed by the switch from the expanded form to the compressed form.

There is also provided, in accordance with a preferred embodiment of the present invention, telecommunications apparatus for use in conjunction with a local switch and including a source/destination discriminator operative to discriminate a source and a destination of a call arriving from the switch, a compressor/decompressor, and a compressor/decompressor controller operative to activate compression or decompression of the call depending on the source or destination of the call.

Further in accordance with a preferred embodiment of the present invention, the apparatus also includes a multiplexer/demux to demultiplex a plurality of channels arriving from the switch, thereby to allow a single call on a single channel to be processed and to multiplex a plurality of calls processed by the discriminator and the controller onto the switch.

Further in accordance with a preferred embodiment of the present invention, the discriminator, compressor/decompressor and controller each include a plurality of modules each operative to process an individual call from among a corresponding plurality of calls arriving from a digital network, the apparatus also including a multiplexer/demux operative to multiplex output, for a plurality of channels respectively carrying the plurality of calls, onto a digital network and to demultiplex the plurality of calls arriving from the digital network onto the corresponding plurality of modules.

Further in accordance with a preferred embodiment of the present invention, decompression occurs during receiving if the destination is the local switch and compression occurs during transmission if the source is the local switch.

Still further in accordance with a preferred embodiment of the present invention, demasking occurs during transmission if the source is a remote switch and masking occurs during receiving if the destination is a remote switch.

Additionally in accordance with a preferred embodiment of the present invention, the apparatus is implemented, at least in part, as a card installed in the switch.

Additionally in accordance with a preferred embodiment of the present invention, the apparatus is implemented, at least in part, as a stand-alone device associated with the switch.

Further in accordance with a preferred embodiment of the present invention, the apparatus is implemented, at least in part, in software installed in the switch.

Still further in accordance with a preferred embodiment of the present invention, the switch includes a private branch exchange installed at a service provider site.

There is also provided, in accordance with a preferred embodiment of the present invention, a telecommunications method for use in conjunction with a local switch and including discriminating a source and a destination of a call arriving from the switch, and activating compression or decompression of the call depending on the source or destination of the call.

Further in accordance with a preferred embodiment of the present invention, the method also includes demultiplexing a plurality of channels arriving from the switch, thereby to allow a single call on a single channel to be processed and multiplexing a plurality of processed calls onto the switch.

Still further in accordance with a preferred embodiment of the present invention, decompression occurs during receiving if the destination is the local switch and compression occurs during transmission if the source is the local switch.

Additionally in accordance with a preferred embodiment of the present invention, demasking occurs during transmission if the source is a remote switch and masking occurs during receiving if the destination is a remote switch.

There is also provided, in accordance with a preferred embodiment of the present invention, a telecommunications transmission method for use in conjunction with a local switch operative in either of a bypass mode and a pass through mode, the method including compressing outcoming information for which the local switch has operated in pass through mode, and restoring information bypassed by the switch from an expanded form to a compressed form without compressing the information.

Also provided, in accordance with a preferred embodiment of the present invention, is a telecommunication receiving method for use in conjunction with a local switch operative in either of a bypass mode and a pass through mode, the method including decompressing incoming information for which the local switch is to operate in pass through mode, and expanding information to be bypassed by the switch, without decompressing the information, from a compressed form to an expanded form.

Further in accordance with a preferred embodiment of the present invention, at least one of the selective compressor/decompressor and the selective masker/demasker is provided integrally with the local switch.

Still further in accordance with a preferred embodiment of the present invention, the selective masker is operative to add dummy bits to the information to be bypassed at a predetermined location within the information.

Further in accordance with a preferred embodiment of the present invention, the switch includes a public branch exchange.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
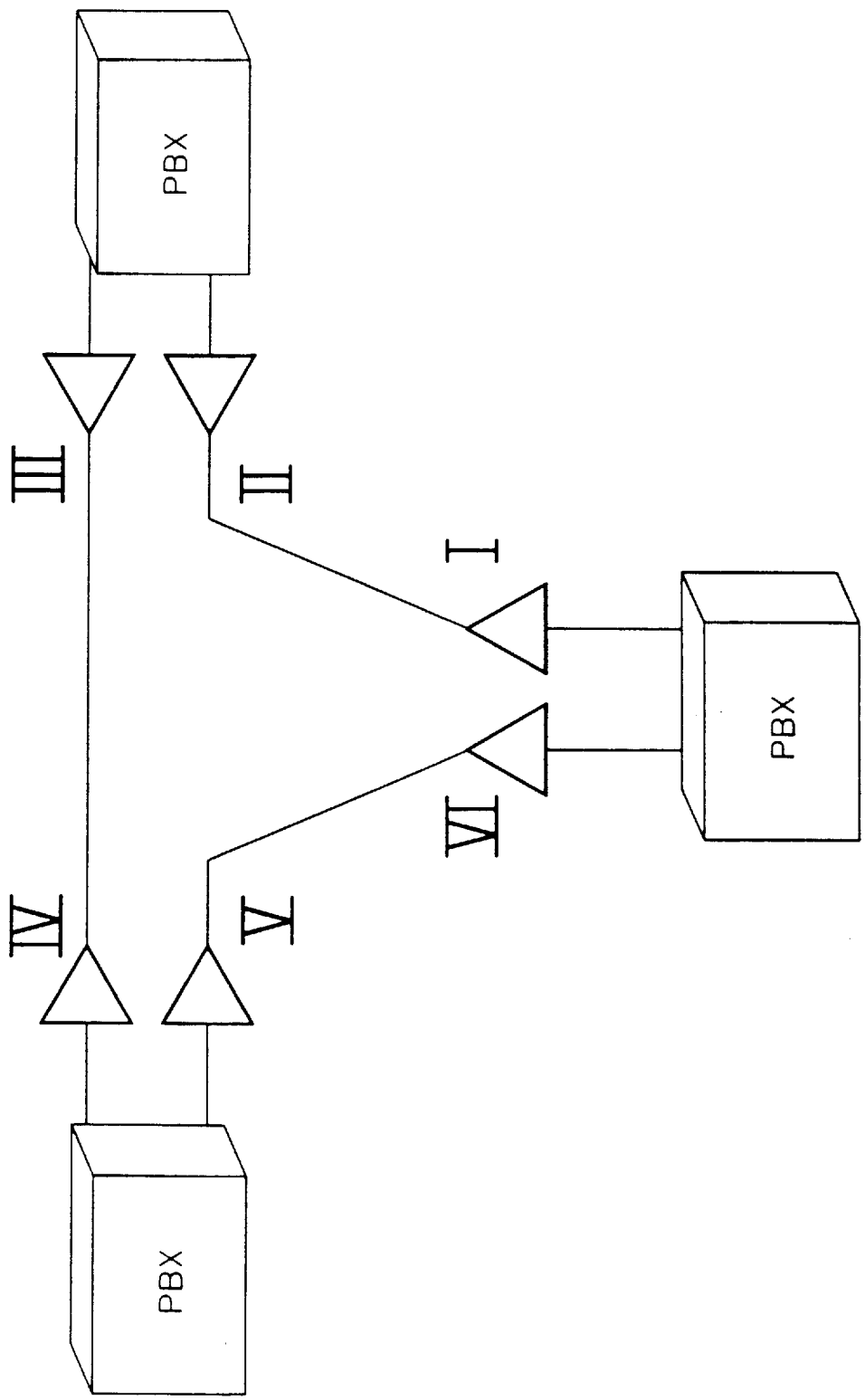
FIG. 1 is a simplified functional block diagram of a prior art network including compressing multiplexers.
Figure 1A:
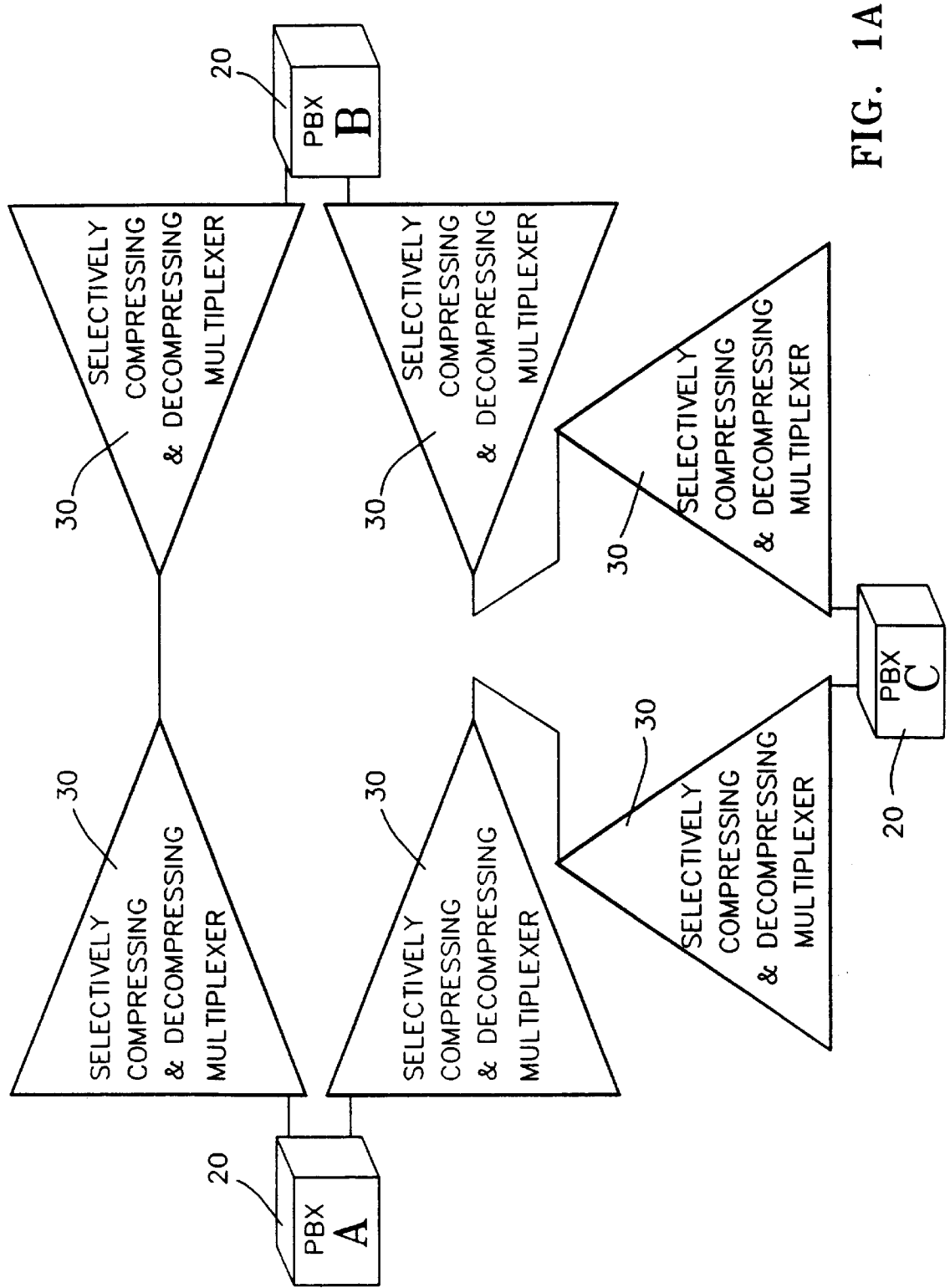
FIG. 1A is a simplified functional block diagram of selectively compressing and decompressing multiplexer systems and accompanying switchboards and digital network, all constructed and operative in accordance with a preferred embodiment of the present invention.

FIG. 1A is a simplified functional block diagram of selectively compressing and decompressing multiplexer systems and accompanying switchboards and digital network, all constructed and operative in accordance with a preferred embodiment of the present invention. A particular feature of the apparatus of FIG. 1A is that individual calls passing from one site to another are compressed only once and are decompressed only once.

The apparatus of FIG. 1A includes a plurality of local switches 20, such as voice switches, of which three are shown, each of which is associated with a selectively compressing and decompressing multiplexer system 30. Each voice switch 20 typically comprises a private or public, typically automatic, branch exchange (PABX), so that the term "PABX" as referred to hereinbelow refers generally to any suitable voice switch.

Each local switch can support analog signals or digital signals in standard form such as PCM or in compressed form.

Figure 6A:
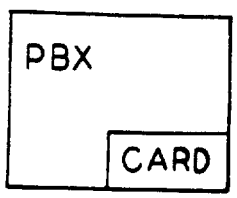
FIG. 6A shows a switch with a card installed therein.
Figure 6B:
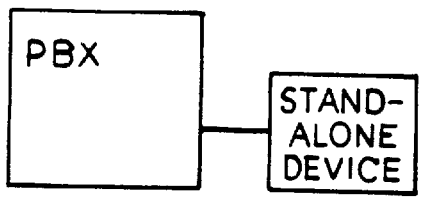
FIG. 6B shows a switch with a stand-alone device.
Figure 6C:
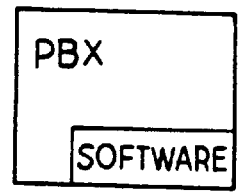
FIG. 6C shows a switch with installed software.

Each selectively compressing and decompressing multiplexer system 30 may be implemented as a card installed in a PABX, or as software loaded in the PABX, or as a stand-alone device, which is retrofitted to or otherwise associated with a PABX. These alternatives are illustrated in FIGS. 6A to 6C. FIG. 6A shows the system 30 implemented as a card. FIG. 6B shows the system 30 implemented as a stand-alone device, and FIG. 6C shows the system 30 implemented in installed software. According to still a further alternative, the various functions of the selectively compressing and decompressing multiplexer system 30, as described below, may be divided between two or more of the above implementation options (card, software or stand-alone device).

A particular feature of each multiplexer system 30 is that it is operative to discriminate the mode (bypass or pass through) of each outgoing voice call and to selectively compress each outgoing voice call. The term "outgoing voice call" refers to a call which is being bypassed or passed through (i.e. out of) the switch 20 associated with the multiplexer system 30. Typically, an outgoing voice call is compressed if it is being passed through and is not compressed if it is merely being bypassed.

Each multiplexer system 30 is also operative to discriminate the mode (bypass or pass through) of each incoming voice call and to selectively decompress each incoming voice call. The term "incoming voice call" refers to a call which is being bypassed or passed through (i.e. into) the switch 20 associated with the multiplexer system 30. Typically, an incoming voice call is decompressed if it is being passed through and is not decompressed if it is being bypassed.

Figure 1B:
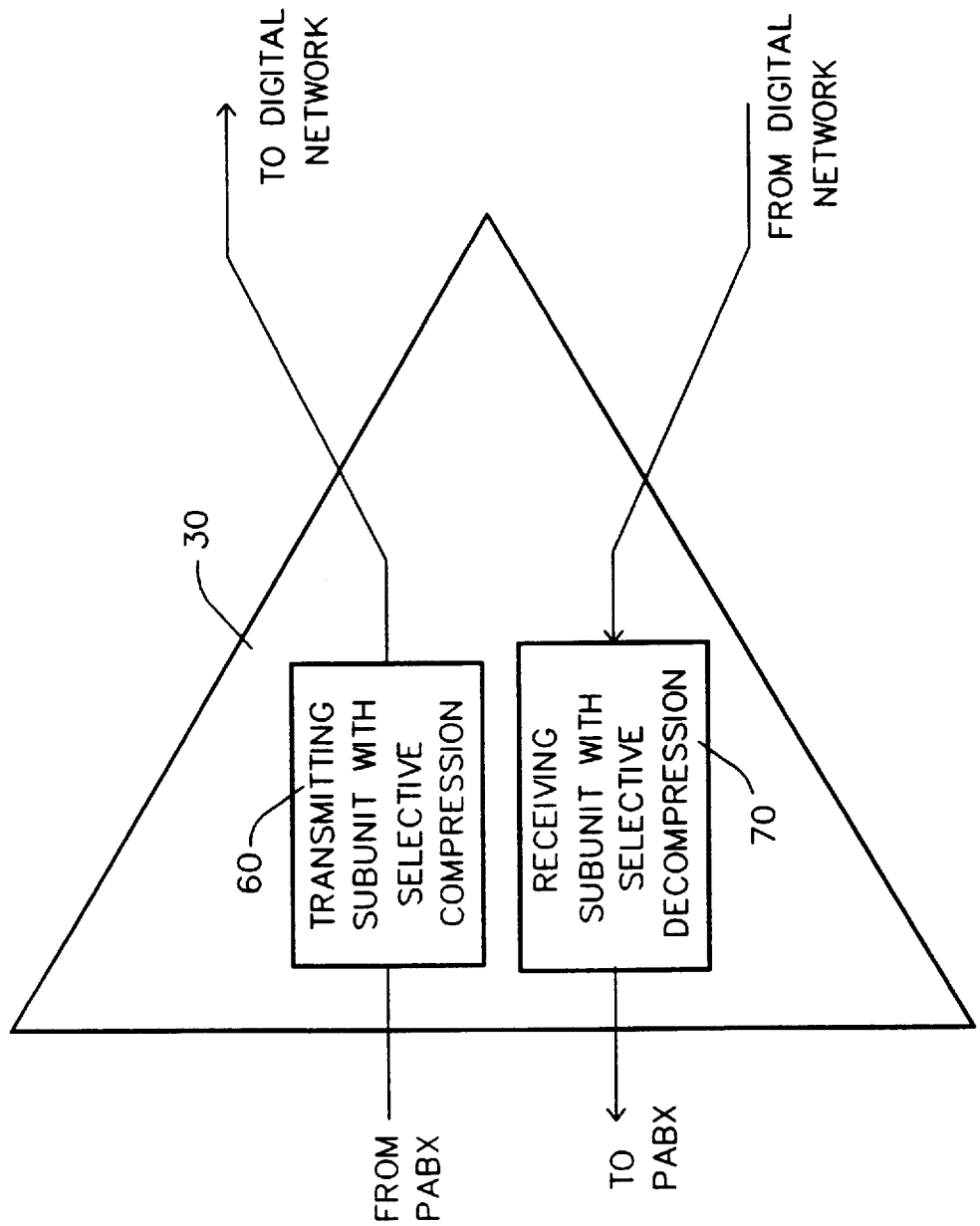
FIG. 1B is a simplified functional block diagram of an individual one of the selectively compressing and decompressing multiplexer systems of FIG. 1.
Figure 1C:
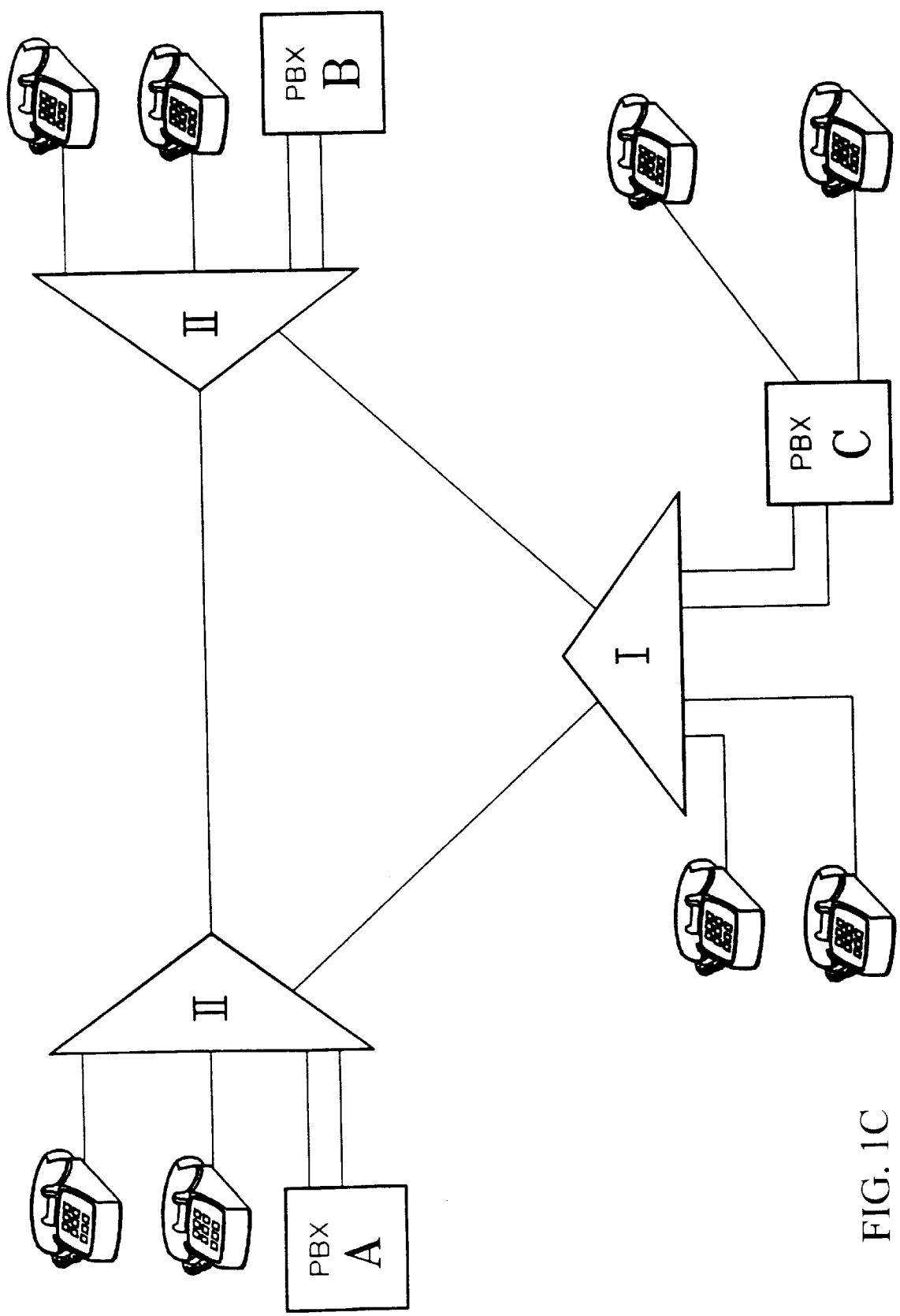
FIG. 1C is a simplified block diagram of a prior art network including compressing multiplexers which are also operative to perform routing.

As shown in FIG. 1B, each multiplexer system 30 includes a selectively compressing transmitting subunit 60 which is operative to selectively compress as described above and a selectively decompressing receiving subunit 70 which is operative to selectively decompress as described above. Preferred embodiments of transmitting and receiving subunits 60 and 70 are described below with reference to FIGS. 2 and 3 respectively.

Figure 2:
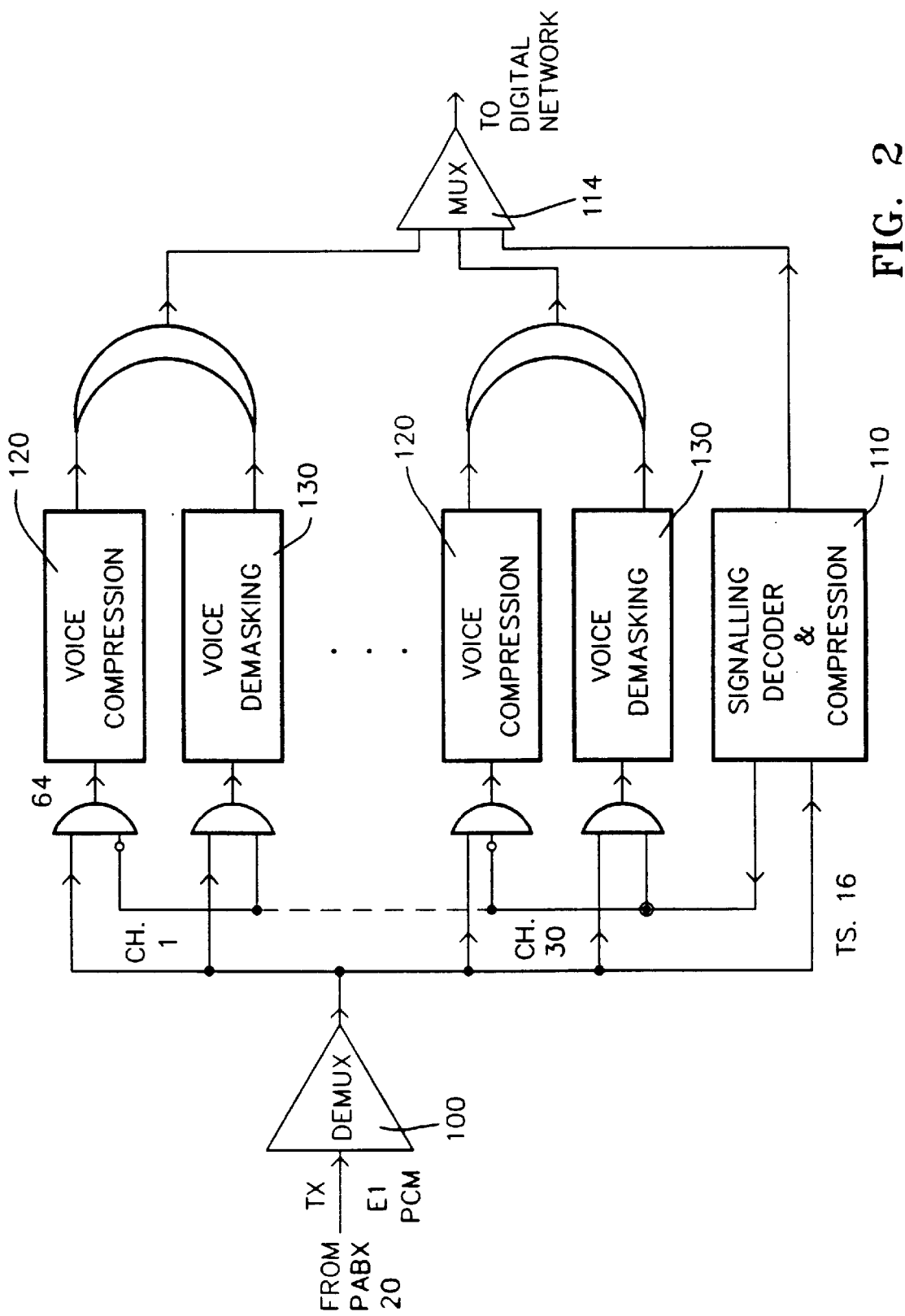
FIG. 2 is a simplified functional block diagram of an individual transmitting subunit 60 constructed and operative in accordance with a preferred embodiment of the present invention.

FIG. 2 is a simplified functional block diagram of an individual transmitting subunit 60 constructed and operative in accordance with a preferred embodiment of the present invention. The transmitting subunit 60 of FIG. 2 typically includes a demultiplexer 100 which derives time frame synchronization information from a synchronization channel (as in El applications) or from a synchronization bit (as in T1 applications) arriving from PABX 20 of FIG. 1A and employs this information to demux the voice channels and the signalling channel arriving from the PABX.

The signalling channel information is received by a signalling decoder and compression unit 110 which decodes the signalling information, thereby to derive an indication of whether the call is being transmitted in bypass mode or in passthrough mode. Signaling decoder and compression unit 110 also compresses the signalling information and provides the compressed signalling information to a multiplexer 114 in order to save bandwidth on the digital network. Typically, the network capacity is 64 kbps or an integer multiple thereof and the signalling decoder and compression unit 110 compresses the signalling information from 64 kbps to 8 kbps.

The indication of the source of each call generated by unit 110 determines whether a voice compressor 120 or a voice demasker 130 will be activated, for each call. If the source is the local PABX, voice compressor 120 is activated. Otherwise, the demasker 130 is activated. The voice compressor unit 120 typically performs wave form coding voice compression from 64 kbps PCM to 8 kbps. The demasker 130 extracts the relevant compressed voice information. In the illustrated embodiment, the demasker 130 extracts from the 64 kbps, the relevant 8 kbps of compressed voice, i.e. the 8 kbps which represent the voice information from the remote PABX which has been bypassed through the local PABX. The remaining 56 kbps are "dummy" bits, such as all 1'.

The output of the activated unit, i.e. either voice compressor 120 or voice demasker 130, is provided to the multiplexer 114 for each of the voice channels which are being processed, which may for example comprise up to 30 E1 voice channels or up to 24 T1 voice channels. This output comprises 24 or 30 or any other smaller or larger number of compressed voice calls. The multiplexer 114 multiplexes the compressed voice call data into the digital network.

Figure 7:
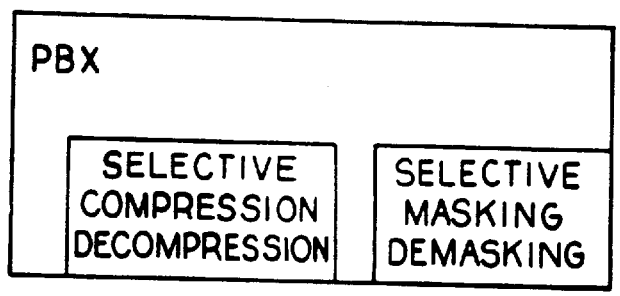
FIG. 7 shows a switch with integrated selective compression/decompression and integrated selective masking/demasking.

FIG. 7 shows the compressor 120 and voice demasker 130 integrated into a local PBX switch.

Figure 3:
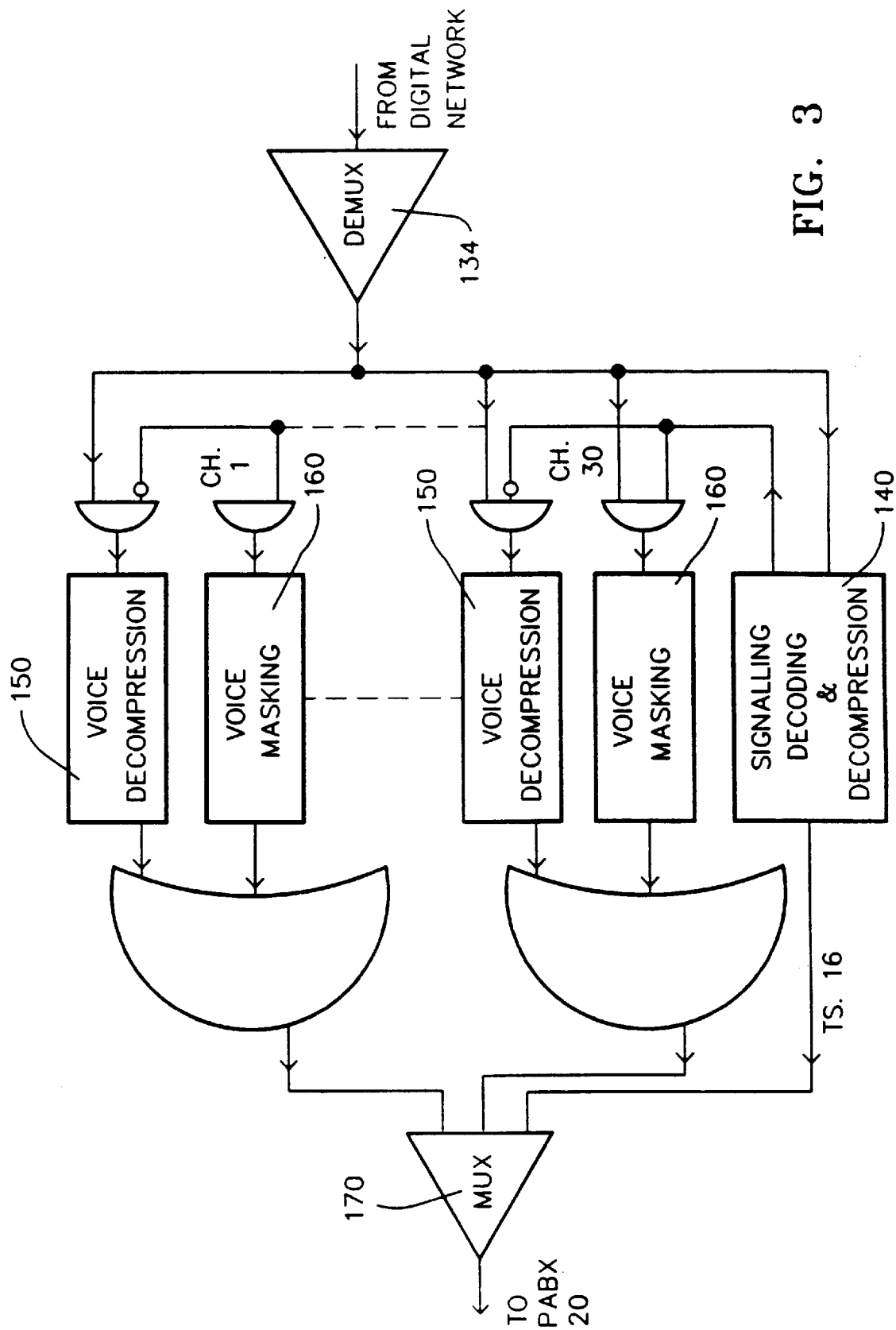
FIG. 3 is a simplified functional block diagram of an individual receiving subunit 70 constructed and operative in accordance with a preferred embodiment of the present invention.

FIG. 3 is a simplified functional block diagram of an individual receiving subunit 70 constructed and operative in accordance with a preferred embodiment of the present invention. The apparatus of FIG. 3 generally performs the reverse operations of the apparatus of FIG. 2. Specifically, the receiving subunit 70 of FIG. 3 typically includes a demultiplexer 134 which derives time frame synchronization information from a synchronization bit arriving from the digital network and employs this information to demux the voice channels and the signalling channel arriving from the voice switch.

The signalling channel information is received by a signalling decoder and decompression unit 140 which decompresses the signalling information and then decodes the decompressed information, thereby to derive an indication of whether the call is being transmitted in bypass mode or pass-through mode. Signaling decoder and decompression unit 140 also decompresses the signalling information which was typically transmitted in compressed format in order to save bandwidth on the digital network. Typically, the network capacity is 64 kbps and the signalling decoder and decompression unit 140 decompresses the signalling information from 8 kbps up to 64 kbps.

The indication of the mode (bypass or pass-through) of each call generated by unit 140 determines whether a voice decompressor 150 or a voice masker 160 will be activated, for each call. If the destination is the local PABX, voice decompressor 150 is activated. Otherwise, the masker 160 is activated. The voice decompressor unit 150 typically performs wave form coding voice decompression from 8 kbps up to 64 kbps PCM. The masker 160 masks the relevant voice information. In the illustrated embodiment, the masker 160 masks the relevant 8 kbps of compressed voice information in 64 kbps, e.g. by adding 56 kbps comprising all 1's or all 0's. The relevant 8 kbps are those which represent the voice information destined for the remote PABX which has been bypassed through the local PABX.

The output of the activated unit, i.e. either voice decompressor 150 or voice masker 160, is provided to a multiplexer 170 for each of the voice channels which are being processed, which may for example comprise up to 30 E1 voice channels or up to 24 T1 voice channels. This output comprises 24 or 30 or any other number of compressed voice calls. The multiplexer 170 multiplexes the decompressed voice call data into the PABX 20.

Figure 4:
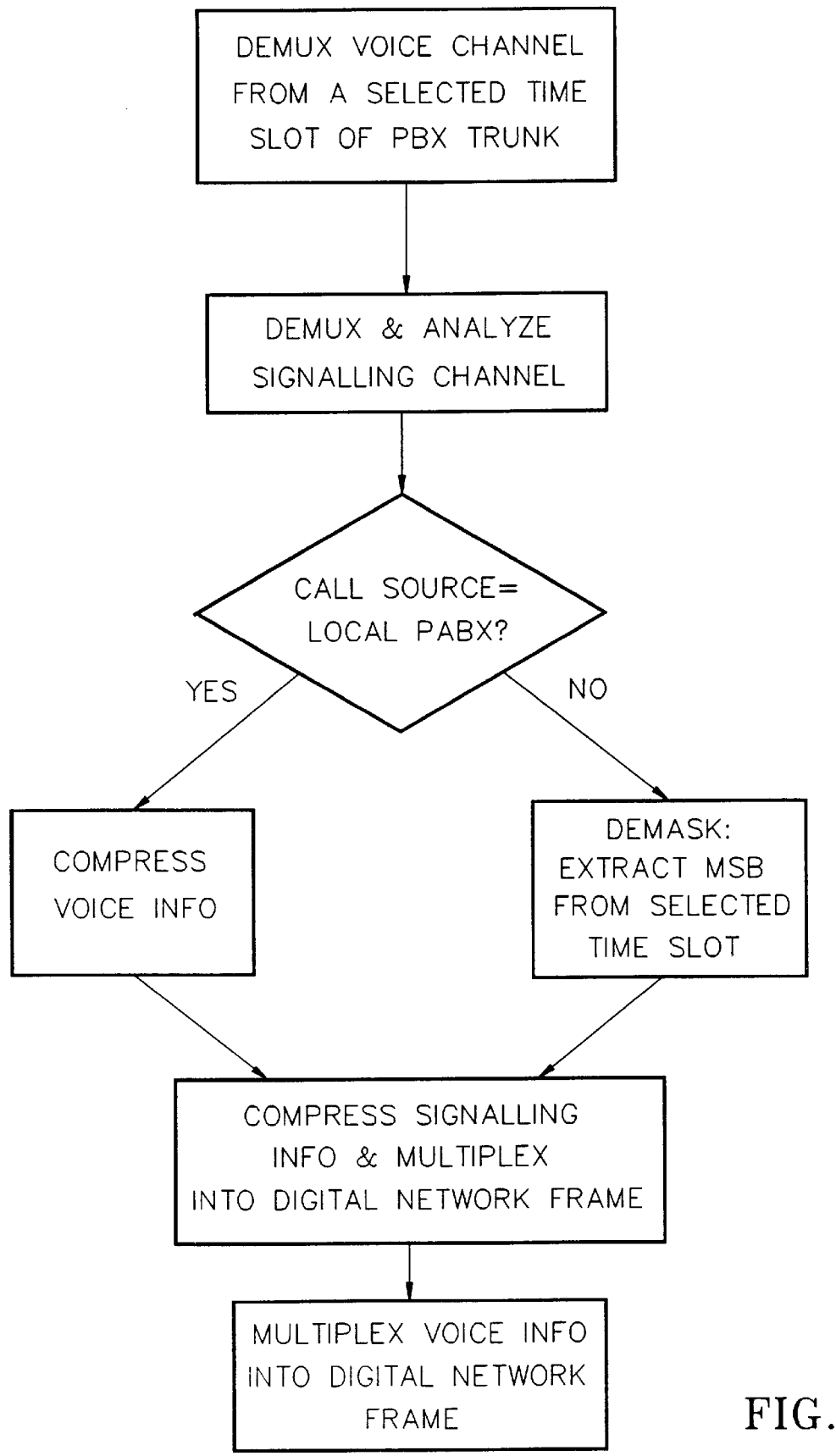
FIG. 4 is a simplified flowchart of a preferred method of operation for the apparatus of FIG. 2.
Figure 5:
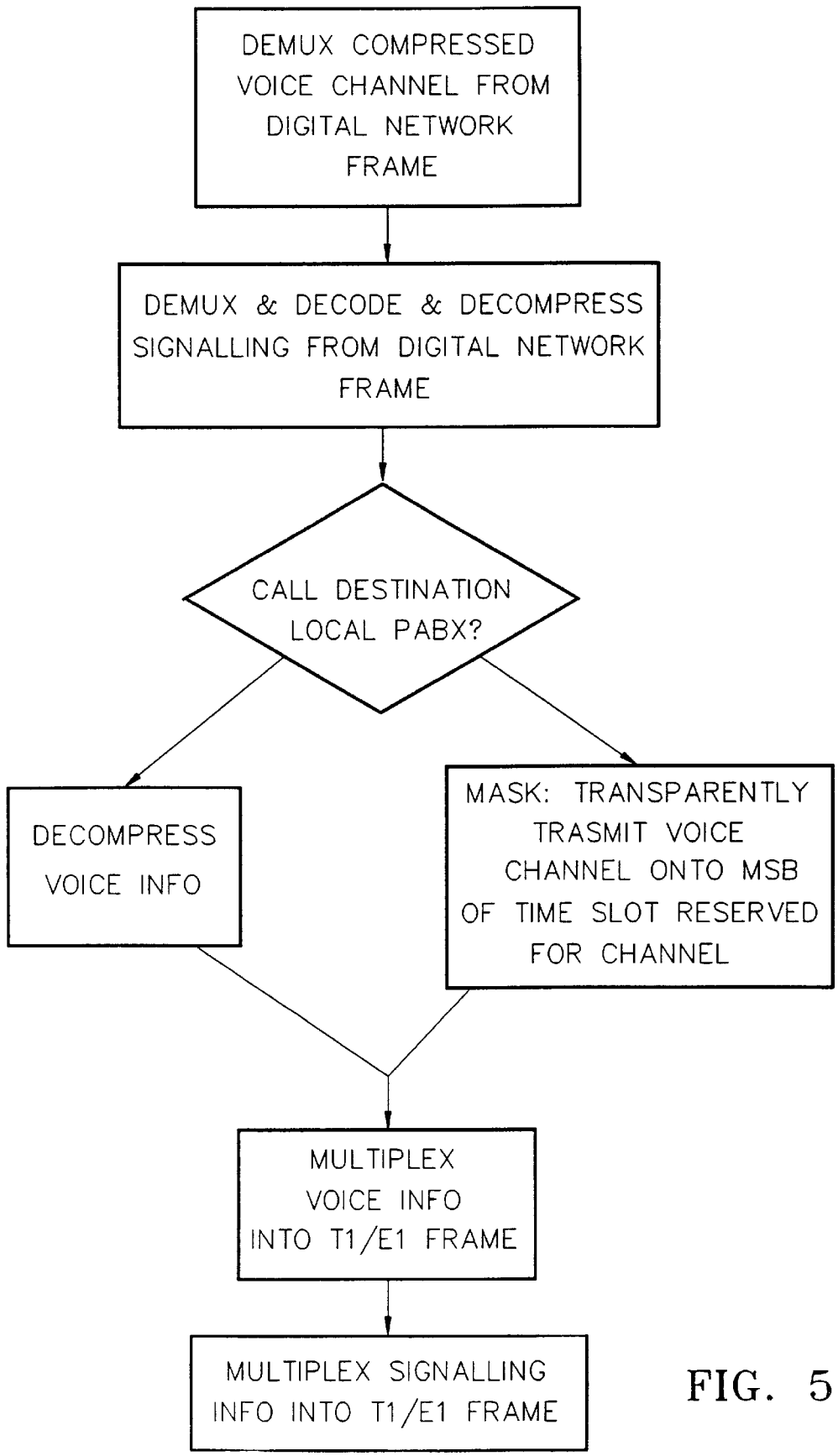
FIG. 5 is a simplified flowchart of a preferred method of operation for the apparatus of FIG. 3.

Preferred methods of operation for the apparatus of FIGS. 2 and 3 respectively are illustrated in FIGS. 4 and 5 respectively.

Figure 8:
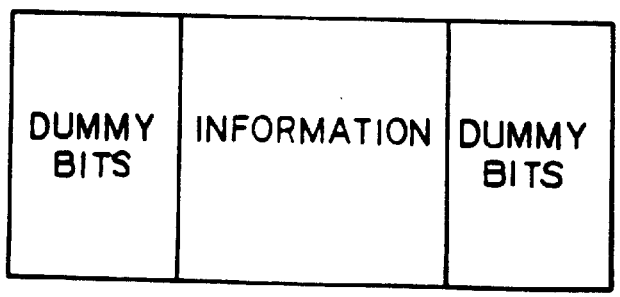
FIG. 8 shows information with dummy bits inserted.

FIG. 8 shows, in diagrammatic form information to which dummy bits have been added by a masker 160.

The applicability of the present invention is not limited to PABX's but rather includes also PBX applications generally and particularly applications in which a public PBX is installed at a service provider site.

It is appreciated that notwithstanding use of terms such as "voice switch" in the present specification, the applications of the present invention are not limited to transmission of voice data and are equally applicable to transmission of other types of data such as computer data and video data. Also, the term "compression" as employed herein is intended to include any scheme which results in a reduction in the bandwidth of the signal undergoing compression or in the number of bits used to represent the signal.

An advantage of the embodiment shown and described herein is that the multiplexers need not increase in complexity for a network of increased complexity since it is not necessary to define the network topology for the multiplexer.

It is appreciated that the term "voice" as used herein is intended to be exemplary of any type of analog data such as voice data or, alternatively, video data.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

I claim:

1. Telecommunications apparatus for use in conjunction with a local switch operative in either of a bypass mode and a pass through mode, the apparatus comprising:

a selective compressor/decompressor operative to decompress incoming information for which the local switch is to operate in pass through mode into an uncompressed form and to compress outgoing information for which the local signal switch has operated in pass through mode; and a selective masker/demasker operative to expand information to be bypassed by the switch, from a compressed form to an expanded form without decompressing said information into said uncompressed form and to restore information bypassed by the switch from the expanded form to the compressed form.

2. Apparatus according to claim 1 which is implemented, at least in part, as a card installed in the switch.

3. Apparatus according to claim 1 which is implemented, at least in part, as a stand-alone device associated with the switch.

4. Apparatus according to claim 1 which is implemented, at least in part, in software installed in the switch.

5. Apparatus according to claim 1 wherein the switch comprises a private branch exchange installed at a service provider site.

6. Apparatus according to claim 1 wherein at least one of the selective compressor/decompressor and the selective masker/demasker is provided integrally with the local switch.

7. Apparatus according to claim 1 wherein the selective masker is operative to add dummy bits to the information to be bypassed at a predetermined location within the information.

8. Apparatus according to claim 1 wherein the switch comprises a public branch exchange.

9. Apparatus according to claim 1 wherein the switch is operative to support analog signals or digital signals in standard form such as PCM or in compressed form.

10. A telecommunications transmission method for use in conjunction with a local switch operative in either of a bypass mode and a pass through mode, the method comprising:

compressing outcoming information for which the local switch has operated in pass through mode; and restoring information bypassed by the switch from an expanded form to a compressed form without compressing the information from a decompressed form to said compressed form.

11. Apparatus according to claim 10 wherein the switch is operative to support analog signals or digital signals in standard form such as PCM or in compressed form.

12. A telecommunication receiving method for use in conjunction with a local switch operative in either of a bypass mode and a pass through mode, the method comprising:

decompressing incoming information for which the local switch is to operate in pass through mode from a compressed format to an uncompressed format; and expanding information to be bypassed by the switch, from a compressed form to an expanded form without decompressing the information into said uncompressed format.

13. Apparatus according to claim 12 wherein the switch is operative to support analog signals or digital signals in standard form such as PCM or in compressed form.

* * * * *